United States Patent [19]
Matsushita et al.

[11] Patent Number: 5,636,341
[45] Date of Patent: Jun. 3, 1997

[54] FAULT PROCESSING METHOD AND INFORMATION PROCESSING SYSTEM

[75] Inventors: Masayuki Matsushita, Hadano; Atsushi Ugajin, Sagamihara; Shooichi Murase, Kokubunji, all of Japan

[73] Assignee: Hitachi, Ltd., Tokyo, Japan

[21] Appl. No.: 476,945

[22] Filed: Jun. 7, 1995

[30] Foreign Application Priority Data

Jul. 28, 1994 [JP] Japan .................................. 6-176921

[51] Int. Cl.$^6$ .............................. G06F 11/30; G06F 11/22; G06F 11/00
[52] U.S. Cl. .................. 395/182.11; 395/182.02; 395/182.21; 395/183.01; 340/825.16
[58] Field of Search ............................ 395/182, 181, 395/182.21, 183.19, 200.13, 200.15, 183.01, 182.1, 182.09; 340/825.16

[56] References Cited

U.S. PATENT DOCUMENTS

| | | | |
|---|---|---|---|
| 4,498,133 | 2/1985 | Bolton et al. | 395/200.15 |
| 4,539,564 | 9/1985 | Smithson | 340/825.79 |
| 4,570,261 | 2/1986 | Maher | 395/183.01 |
| 4,605,928 | 8/1986 | Georgiou | 340/827 |
| 4,654,821 | 3/1987 | Lapp | 395/182.21 |
| 4,929,939 | 5/1990 | Varma et al. | 340/825.8 |
| 4,967,344 | 10/1990 | Scavezze et al. | 395/182.02 |
| 5,134,704 | 7/1992 | Leuty | 395/182.16 |
| 5,157,667 | 10/1992 | Carusone, Jr. et al. | 395/182.01 |
| 5,189,665 | 2/1993 | Niehaus et al. | 370/58.1 |
| 5,321,830 | 6/1994 | Nakamura et al. | 395/182.21 |
| 5,343,461 | 8/1994 | Sekihata et al. | 370/13 |
| 5,345,583 | 9/1994 | Davis | 395/182.21 |
| 5,528,749 | 6/1996 | Landis et al. | 359/182.21 |
| 5,537,535 | 7/1996 | Maruyama et al. | 395/183.01 |

FOREIGN PATENT DOCUMENTS 63-44248  2/1988  Japan .

*Primary Examiner*—Robert W. Beausoliel, Jr.
*Assistant Examiner*—Luan Cao Do
*Attorney, Agent, or Firm*—Fay, Sharpe, Beall, Fagan, Minnich & McKee

[57] ABSTRACT

When a fault occurs on a data communication processor that controls data communication between information processors, all information processors connected to the data communication processor are notified of the occurrence of the fault, upon which the information processors automatically reset the data communications processors. A fault detector is provided in an interface controller in a data communications processor 101, a crossbar switch 108, and an arbitration controller 109. When a fault occurs, the fault processor in the interface controller is notified of the occurrence and the failed location by means of a broadcast signal. The fault processor notifies the information processor of the fault by means of an interrupt signal. The notified information processor instructs the data communications processor to reset each controller of the data communication processor for fault recovery.

20 Claims, 9 Drawing Sheets

FAULT PROCESSING METHOD AND INFORMATION PROCESSING SYSTEM

FIELD OF THE INVENTION

The present invention relates to an information processing system having a plurality of information processors and a data communications processor that controls the data communication between the plurality of information processors and, more particularly, to a fault processing method and an information processing system for recovering from faults that take place especially with the data communications processor, the fault being recovered by means of a reset operation by one of the information processors.

BACKGROUND OF THE INVENTION

In an information processing system, it is a general practice to connect many information processors with an interface such as a network for data communication between them, thereby enhancing the performance and reliability of the information processing system as a whole.

The conventional scheme such as mentioned above includes, for example, the automatic switching of communication between duplicated systems as disclosed in Japanese Non-examined Patent Publication No. 63-44248. According to the disclosed scheme, in the duplicate system composed of a master system and a slave system, each system is provided with a network adapter which connects one of the systems to the network through a selector switch. When switching between systems, a monitor for the duplicate system activates the selector switch for switching from the master system to the slave system.

SUMMARY OF THE INVENTION

However, in the above-mentioned conventional scheme, if a fault occurs in the selector switch itself, there is no way to fix the fault. In addition, the conventional scheme is required to provide one master information processor with a slave information processor that backs up the master. Further, the conventional scheme makes it difficult to apply the fault recovery processing to three or more information processors.

Meanwhile, in an information processing system composed of a plurality of information processors and a data communications processor that controls data communication between the plurality of information processors, if a fault occurs in the data communications processor, all interface controllers in the data communications processor connected to the information processors over the communications interface seldom fail simultaneously and, moreover, the fault is often recovered by simply resetting the failed data communications processor.

It is therefore an object of the present invention to provide a fault processing method and an information processing system for recovering a fault detected in a data communications processor that controls data communication between information processors so that all information processors connected to the data communications processor are notified of the occurrence of the fault and the failed data communications processor is reset by the notified information processors.

In carrying out the invention and according to one aspect thereof, there is provided a fault processing method for a data communication processor in an information processing system having a plurality of information processors and a data communication processor for controlling data communication between the plurality of information processors, wherein, if a fault occurs in the data communications processor while the information processing system is operating, all of the plurality of information processors are notified of the occurrence of the fault, the notified plurality of information processors instruct the data communications processor for a reset operation, and the data communications processor resets itself in its entirety.

According to another aspect of the present invention, there is provided an information processing system comprising: a plurality of information processors; and a data communications processor having interface control means connected to the plurality of information processors via an communication interface for controlling data communications between the plurality of information processors. Setting means are provided for setting a data communication path between the interface control means for communicating data from a first information processor to a second information processor. Arbitrating means are also provided for arbitrating data communication requests coming from the interface control means. The data communications processor is provided with detecting means for detecting a fault encountered in any of the interface control means, setting means and arbitrating means in the data communications processor, notifying means for notifying all of the plurality of information processors of the occurrence of the fault via the interface control means, and reset means for resetting the interface control means, setting means and arbitrating means in the data communications processor. The plurality of information processors are provided with instructing means for instructing the data communications processor for a reset operation according to the fault notification, and the data communications processor resets all of the interface control means, setting means and arbitrating means in the data communications processor according to the reset instruction.

In an information processing system composed of a plurality of information processors and a data communications processor that controls data communications between the plurality of information processors, if a fault occurs on the data communications processor, all the information processors connected to the data communications processor are notified of the occurrence of the fault. The notified information processors instruct the data communications processor to reset itself. This setup allows the data communications processor to recover from the fault, thereby minimizing the effect of the fault over the entire system.

DETAILED DESCRIPTION OF THE PREFERRED EMBODIMENTS

This invention will be described in further detail by way of example with reference to the accompanying drawings.

Figure 1:
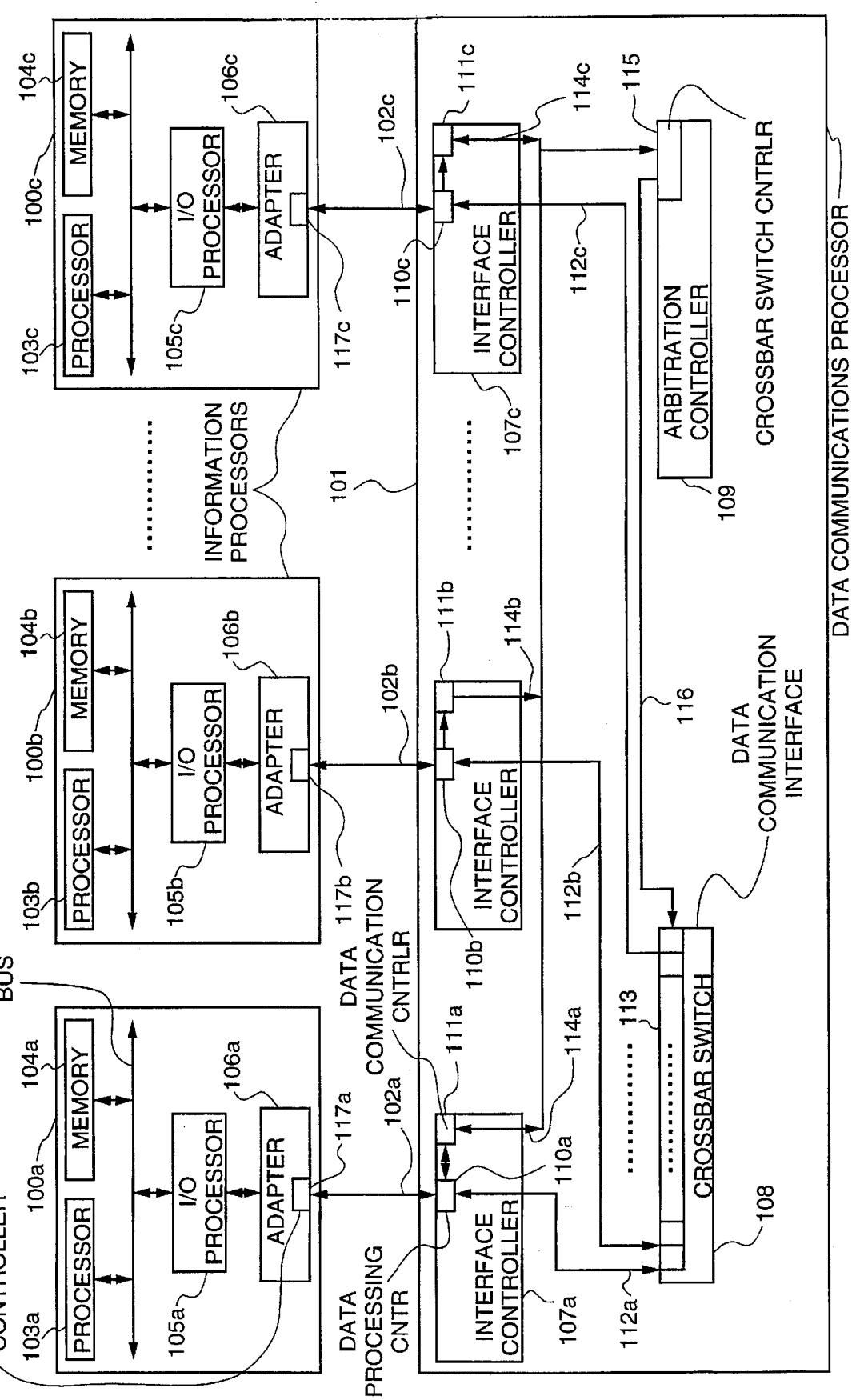
FIG. 1 is a block diagram illustrating the configuration of the information processing system according to the invention.

Now, referring to FIG. 1, there is shown a block diagram illustrating a configuration of the information processing system according to the present invention. In the Figure, the information processing system is shown to include a plurality of information processors (100a through 100c), a data communications processor 101, and data communication interfaces (102a through 102c) for connecting the plurality of information processors (100a through 100c) with the data communications processor 101.

The plurality of information processors (100a through 100c) are respectively composed of processors (103a through 103c) for system control, memories (104a through 104c) for storing a program and data, and input/output (I/O) processors (105a through 105c). These processors, memories, and I/O processors are interconnected through a system bus. The I/O processors are provided with data communication processor adapters (106a through 106c) respectively.

The data communications processor 101 is composed of interface controllers (107a through 107c) for controlling the interface with the information processors (100a through 100c), a crossbar switch 108 for setting and controlling a data communication path, and an arbitration controller 109 for arbitrating and/or controlling data communication requests coming from the interface controllers (107a through 107c).

The interface controllers (107a through 107c) contain data processing controllers (110a through 110c) respectively and data communication controllers (111a through 111c) respectively. The data processing controllers (110a through 110c) are connected to a data communication interface 113 in the crossbar switch 108 via data communication interfaces (112a through 112c) respectively, thereby forming a data communication path in the data communications processor 101 for connecting between the information processors (100a through 100c).

The data communication controllers (111a through 111c) are connected to a crossbar switch controller 115 in the arbitration controller 109 via data communication control interfaces (114a through 114c) respectively, thereby recognizing a destination address attached to data received by the data processing controllers (110a through 110c) to instruct the switching of the crossbar switch 108.

The crossbar switch controller 115 is connected to the data communication interface 113 in the crossbar switch 108 via a crossbar switch control interface 116 and, upon reception of the switch selecting instruction from the data communication controllers (111a through 111c), controls the data communication interface 113 in the crossbar switch 108 based on the selecting instruction to be sent over the crossbar switch control interface 116.

Data communication between the information processors (100a through 100c) and the data communications processor 101 is enabled by connecting the data processing controllers (117a through 117c) in the data communication processor adapters (106a through 106c) to the data processing controllers (110a through 110c) in the interface controllers (107a through 107c) of the data communications processor 101 via the data communication interfaces (102a through 102c) (for example, communication cables).

In what follows, data communication operations in the information processing system constituted as mentioned above will be described by taking, by way of example, a data communications operation from the information processor 100a to the information processor 100b for example.

Figure 2:
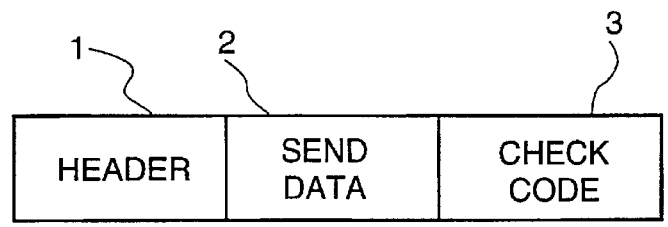
FIG. 2 is a format of send data transferred in the system.

Now, referring to FIG. 2, there is shown a format of send data transferred within the system. In the Figure, reference numeral 1 indicates a header for storing an address of the send data (the address is actually stored in the memory 104a in the information processor). Reference numeral 2 indicates the send data (also stored in the memory 104a in the information processor). Reference numeral 3 indicates a check code. This check code 3 is for checking the send data 2 for integrity. The check code is generated by a bit operation from the contents of the send data 2 in the data processing controller 110a in the interface controller 107a to be attached to the send data 2.

(1) Data send processing in the information processor 100a is performed via the data processing controller 117a in the data communication processor adapter 106a. Namely, upon reception of a data send request from the processor 103a, the data processing controller 117a in the adapter 106a of the data communications processor captures the header 1 and the send data 2 to be stored in the memory 104a.

(2) The header 1 and the send data 2 are sent to the data processing controller 110a in the interface controller 107a via the data communication interface 102a to be attached with the check code 3 as mentioned above.

(3) The data communication controller 111a reads the destination address (in this case, the information processor 100b) of the send data 2 and issues a switching command to the crossbar switch controller 115 in the arbitration controller 109 via the data communication control interface 114a. In this example, this switch command turns on the cross point between the data communication interfaces 112a and 112b. It should be noted that, if a competition occurs among crossbar switch switching requests, prioritization control is performed by the crossbar switch controller 115.

(4) Upon reception of the switching command, the crossbar switch controller 115 a switching operation on the crossbar switch 108 via the crossbar switch control interface 116. Namely, the crossbar switch controller 115 turns on the cross point between the data communication interfaces 112a and 112b.

(5) When the switching operation has been completed, the crossbar switch controller 115 notifies the data communication controller 111a that issued the switching command of the completion of the switching operation.

(6) Having been notified of the completion of the switching operation, the data processing controller 110a sends the send data 1 through 3 to the data processing controller 110b in the interface controller 107b via the data communication interfaces 112a and 112b.

(7) The data interfaces 112a and 112b are connected in the manner of hardware. The data processing controller 110b recognizes the arrival of the data via the data communication interfaces 112a and 112b; that is, the data communication interface 112a recognizes the data has been sent from the information processor 100a to the information processor 110b and sends the send data to the data processing controllers 117b and, at the same time, causes an interrupt thereto.

(8) Having been interrupted, the data processing controllers 117b sends the send data to the memory 104b and interrupts the processor 103b to notify the processor 103b of the arrival of the data.

Figure 3:
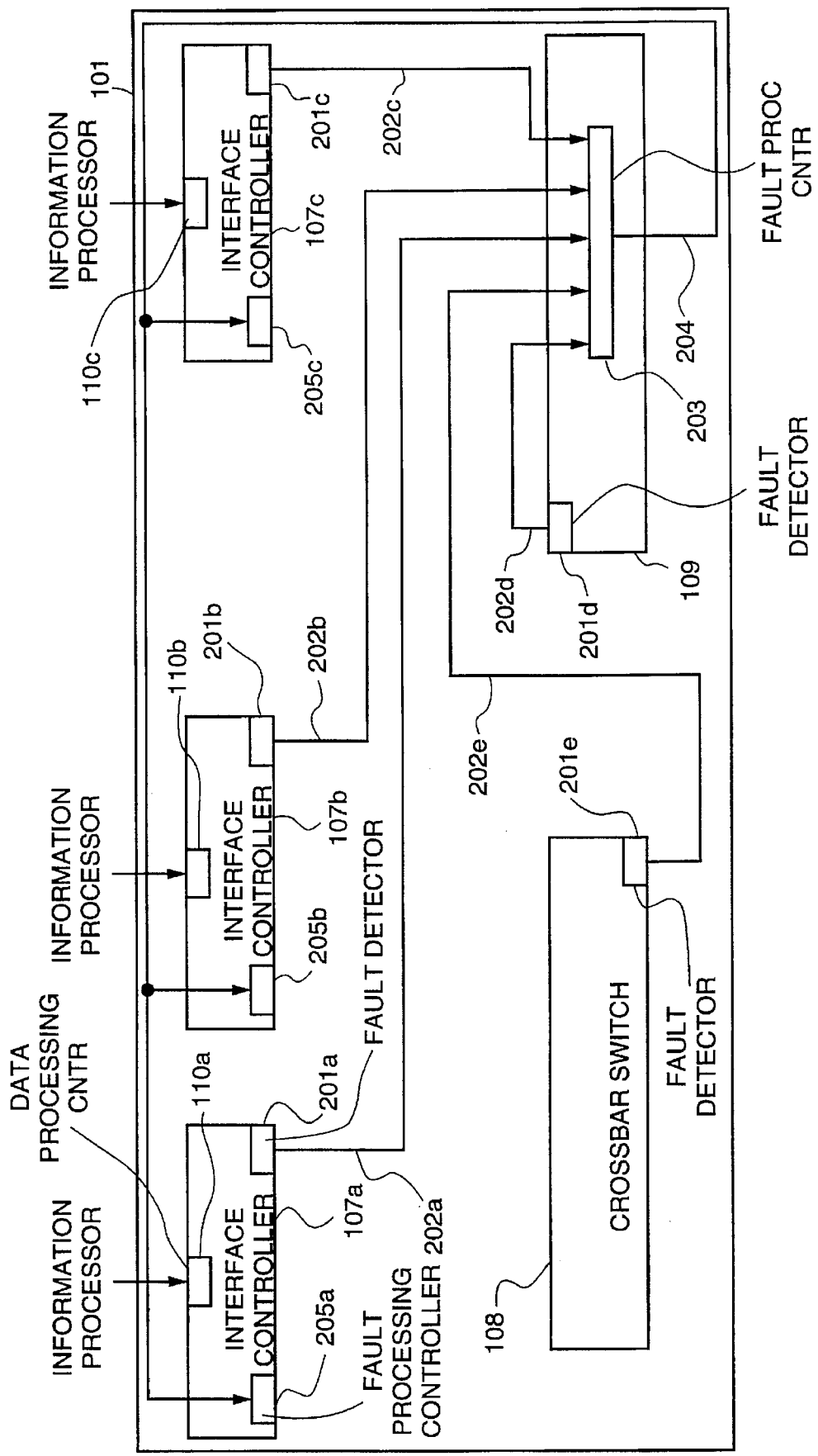
FIG. 3 is a block diagram illustrating the configuration of the data communications processor.

Now, referring to FIG. 3, there is shown a constitution of the data communications processor. The data communications processor according to the present embodiment is constituted so that, if a fault occurs on the data communications processor while the information processing system is operating, the fault is detected and fault processing is performed.

In FIG. 3, the data communications processor 101 comprises the interface controllers (107a through 107c), the arbitration controller 109, and the crossbar switch 108. The interface controllers (107a through 107c) are internally provided with fault detectors (201a through 201c) respectively and fault processing controllers 205a through 205c respectively. When any of the fault detectors (201a through 201c) has detected a fault, the detecting unit turns on a corresponding one of fault detection signals (202a through 202c) to notify the fault processing controller 203 in the arbitration controller 109 of the occurrence of the fault.

The arbitration controller 109 is also internally provided with a fault detector 201d which, upon detection of a fault in the arbitration controller 109, turns on a fault detection signal 202d to notify the fault processing controller 203 of the occurrence of the fault. Further, the crossbar switch 108 is internally provided with a fault detector 201e which, upon detection of a fault in the crossbar switch 108, turns on a fault detection signal 202e to notify the fault processing controller 203 in the arbitration controller 109 of the occurrence of the fault.

Meanwhile, the fault processing controller 203 monitors the fault detection signals (202a through 202e) coming from the interface controllers (107a through 107c), the arbitration controller 109, and the crossbar switch 108. Upon detection of any of the fault detection signals, the fault processing controller 203 recognizes the occurrence of a fault in the data communications processor and turns on a fault broadcast signal 204 to notify the fault processing controllers (205a through 205c) in the interface controllers (107a through 107c) of the occurrence of the fault in the data communications processor.

The faults encountered in the present embodiment are relatively minor faults, and the data communications processor according to the present invention uses no control program, such as a microprogram, rather uses a relatively simple arrangement of hardware logic circuits, so that fault recovery is enabled by turning on/off the power of the data communications processor. The faults that can be recovered include the following:

(a) A send data bit format error that occurs during data transmission between information processors. The fault detectors 201a through 201c in the interface controller detect the bit format error by checking the check code of the send data.

(b) A switching command abnormal processing in which a switch command cannot be performed normally or the like. This fault is detected by the fault detectors 201a through 201c in the interface controller and the fault detector 201d in the arbitration controller.

(c) Abnormal switching processing such as switching to a path connected with no information processor. This fault is detected by the fault detector 201e in the crossbar switch.

Figure 4:
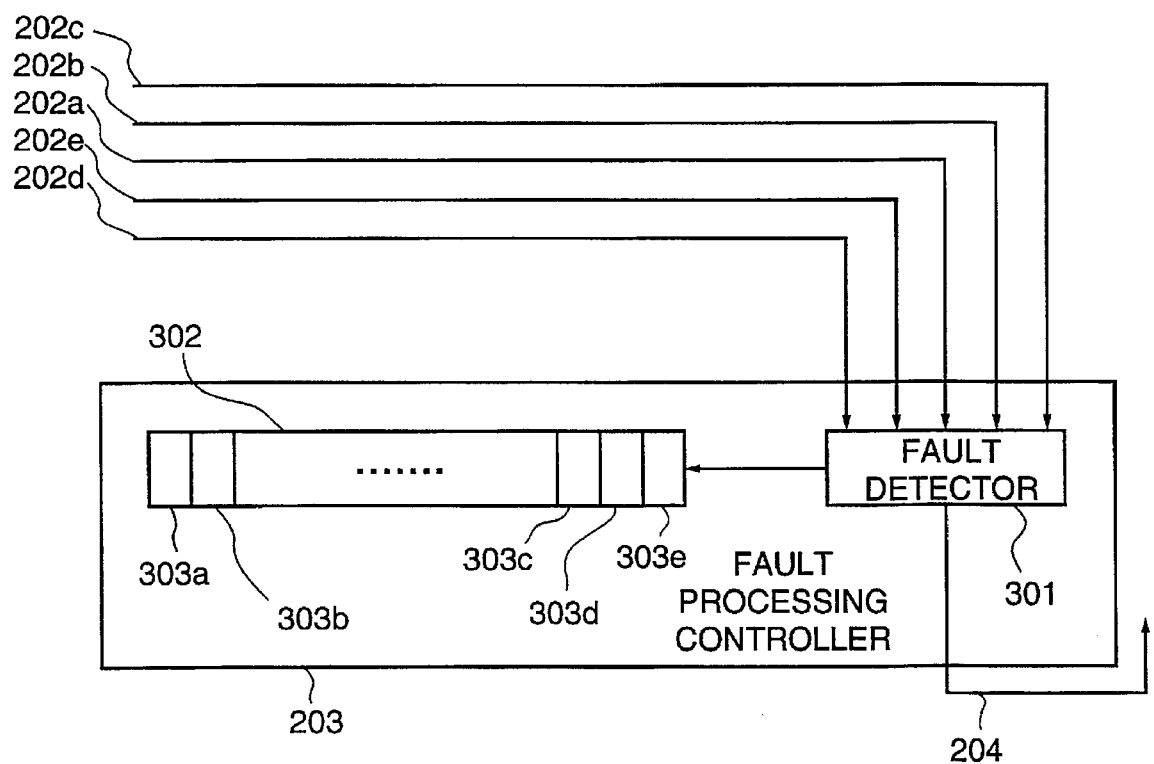
FIG. 4 is a schematic diagram illustrating the fault processing controller provided in the arbitration controller.

Now, referring to FIG. 4, there is shown a configuration of the fault processing controller arranged in the arbitration controller. In the Figure, a fault detector 301 and a fault log register 302 for logging a failed location is provided in the fault processing controller 203.

The fault detector 301 monitors the fault detection signals (202a through 202c) coming from the interface controllers (107a through 107c), the fault detection signal coming from the arbitration controller 109, and the fault detection signal 202e coming from the crossbar switch 108.

In the present embodiment, the fault detector 301 is implemented by performing a logic OR operation on the fault detection signals (202a through 202c). That is, when any of the fault detection signals (202a through 202e) is turned on, the fault detector 301 validates that signal and recognizes the occurrence of a fault.

The fault log register 302 is composed of bits (303a through 303c) for indicating the occurrence of a fault in any one of the interface controllers (107a through 107c), a bit 303d for indicating the occurrence of a fault in the arbitration controller 109, and a bit 303e for indicating the occurrence of a fault in the crossbar switch 108. A bit of the fault log register 302 that indicates the source of the turned-on fault detection signal (202a to 202e) is set to "1".

For example, if a fault occurs in the interface controller 107b and the fault detection signal 202b is turned on, the fault detector 301 detects the fault and sets the bit 303b of the fault log register 302 to "1".

Upon detecting any of the fault detection signals (202a through 202e), the fault detector 301 recognizes the detected signal and sets the failed location indicating bit of the fault log register 302 to "1". Then, the fault detector 301 turns on the fault broadcast signal 204, sends the contents of the fault register 302 to the interface controllers (107a through 107c), and notifies the interface controllers (107a through 107c) of the fault occurrence in the data communications processor 101.

Figure 5:
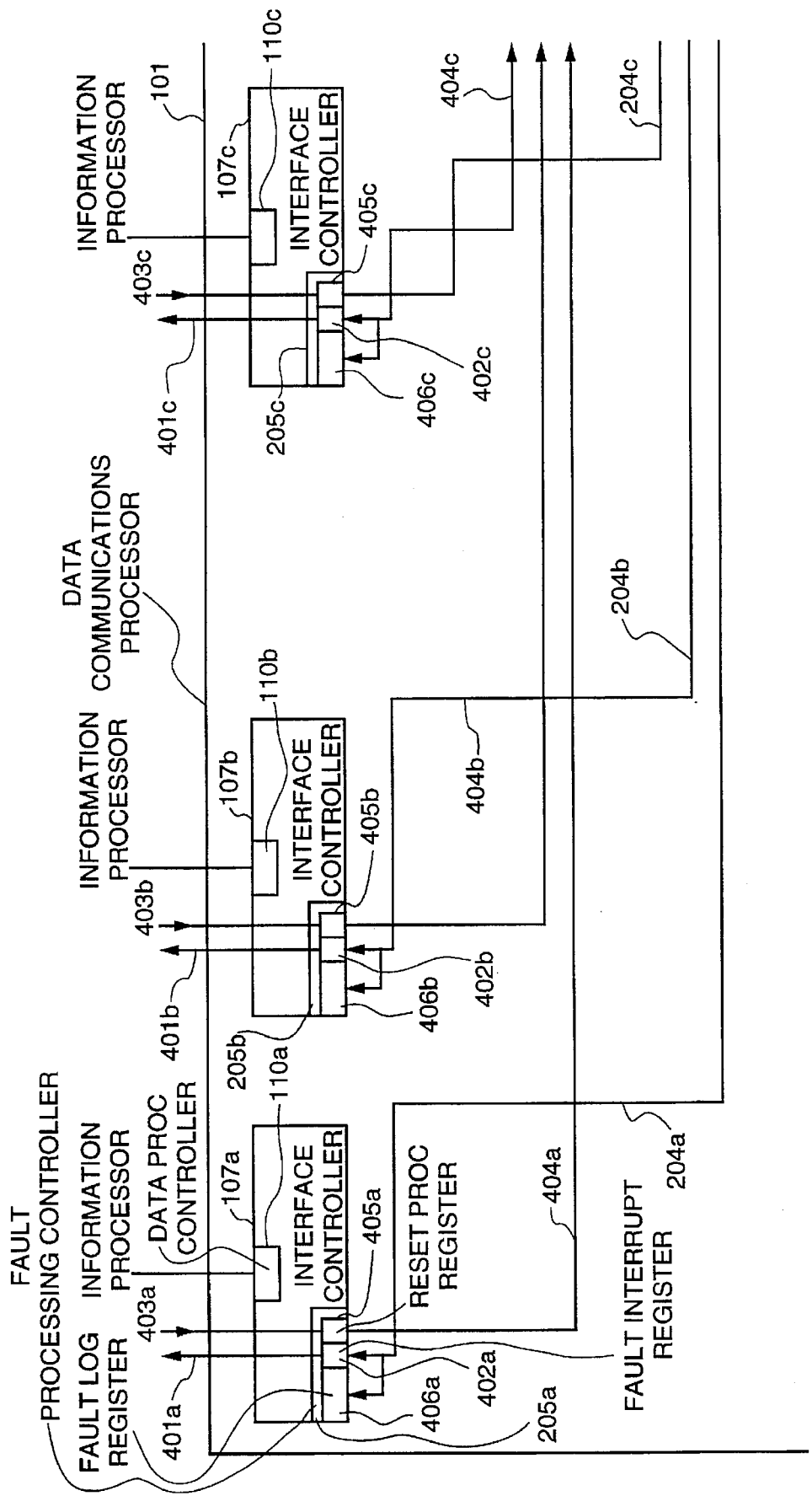
FIG. 5 is a block diagram illustrating the interface controller in the data communications processor.

Now, referring to FIG. 5, there is shown a configuration of the interface controllers. Fault processing controllers (205a through 205c) are composed of fault interrupt registers (402a through 402c), respectively, that receive the fault broadcast signals (204a through 204c), respectively, from the fault detector 301 (FIG. 4) in the arbitration controller 109 to generate fault interrupt signals (401a through 401c) to the data communication processor adapters (106a through 106c), respectively, in the information processors (100a through 100c), respectively, reset processing registers (405a through 405c) the receive reset instruction signals (403a through 403c) from the data communication processor adapters (106a through 106c), respectively, to generate reset request signals (404a through 404c) to the arbitration controller 109, and fault log registers (406a through 406c) that store the contents of the fault log register 302 sent along with the fault broadcast signals (204a through 204c).

Upon reception of the fault broadcast signals (204a through 204c) from the fault detector 301 in the arbitration controller 109, the fault interrupt registers (402a through 402c) are set high (bit=1) to generate the fault interrupt signals (401a through 401c) to the data communication processor adapters (106a through 106c) respectively and store the contents of the fault log register 302 into the fault log registers (406a through 406c).

The following describes an example of fault processing in the data communication processor adapters (106a through 106c) in the information processors (100a through 100c) respectively that have received the fault interrupt signals (401a through 401c) respectively, with reference to the data communication processor adapter 106.

Figure 6:
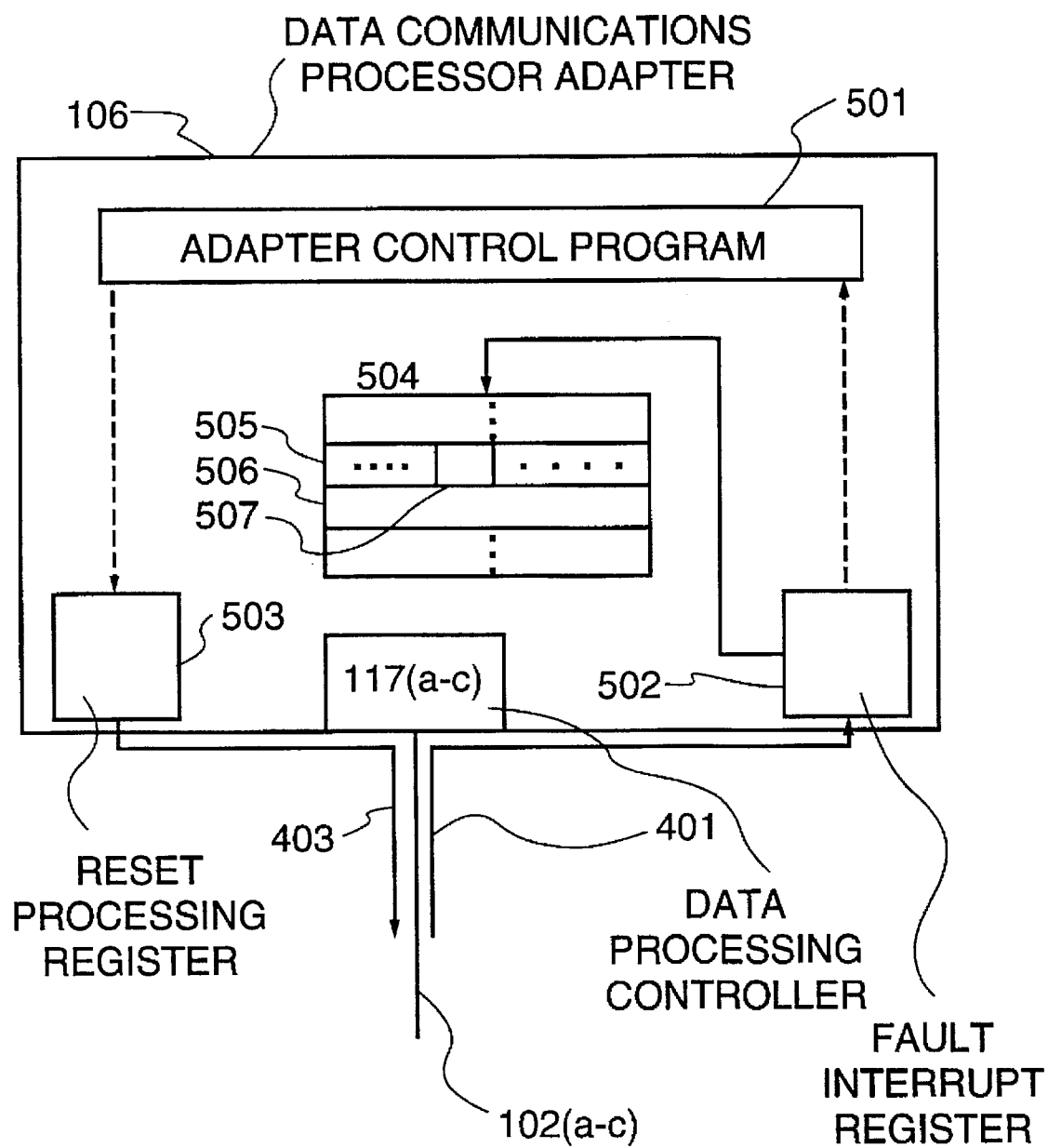
FIG. 6 is a schematic diagram illustrating the configuration of the data communication processor adapter.

Referring to FIG. 6, there is shown a configuration of the data communication processor adapter 106. The data communication processor adapter 106 is composed of an adapter control program 501 for controlling the adapter and a fault interrupt register 502 that receives the fault interrupt signal 401 from the interface controllers (107a through 107c) and sets the control bit to "1" to cause the adapter control program 501 to generate a fault interrupt. The adapter 106 also includes a reset processing register 503 that receives a reset instruction from the adapter control program 501 and sets the control bit to "1" to output the reset instruction signal 403 to the data communications processor 101, and a fault cause control register for controlling fault logs.

Upon reception of the fault interrupt signal 401, the fault interrupt register 502 recognizes the source of the fault interrupt signal 401 and logs the fault occurrence in the source into the fault cause control register 504. The fault cause control register 504 stores fault encounter information for each of the modules constituting the information processing system and includes a register HUB_STATUS 505 for controlling the fault information of the data communications processor 101 and a register HUB_ADP_STATUS 506 for controlling the fault information of the data communication processor adapter 106.

In the present embodiment, when the data communications processor 101 has a failure and the fault interrupt register 502 is notified of the fault occurrence from the interface controller 107a by the fault interrupt signal 401, the fault interrupt register 502 sets a bit HUB_ERR 507 in the register HUB_STATUS 505 that indicates the data communication processor error to "1" and causes the adapter control program 501 to perform fault interrupt processing.

Figure 7:
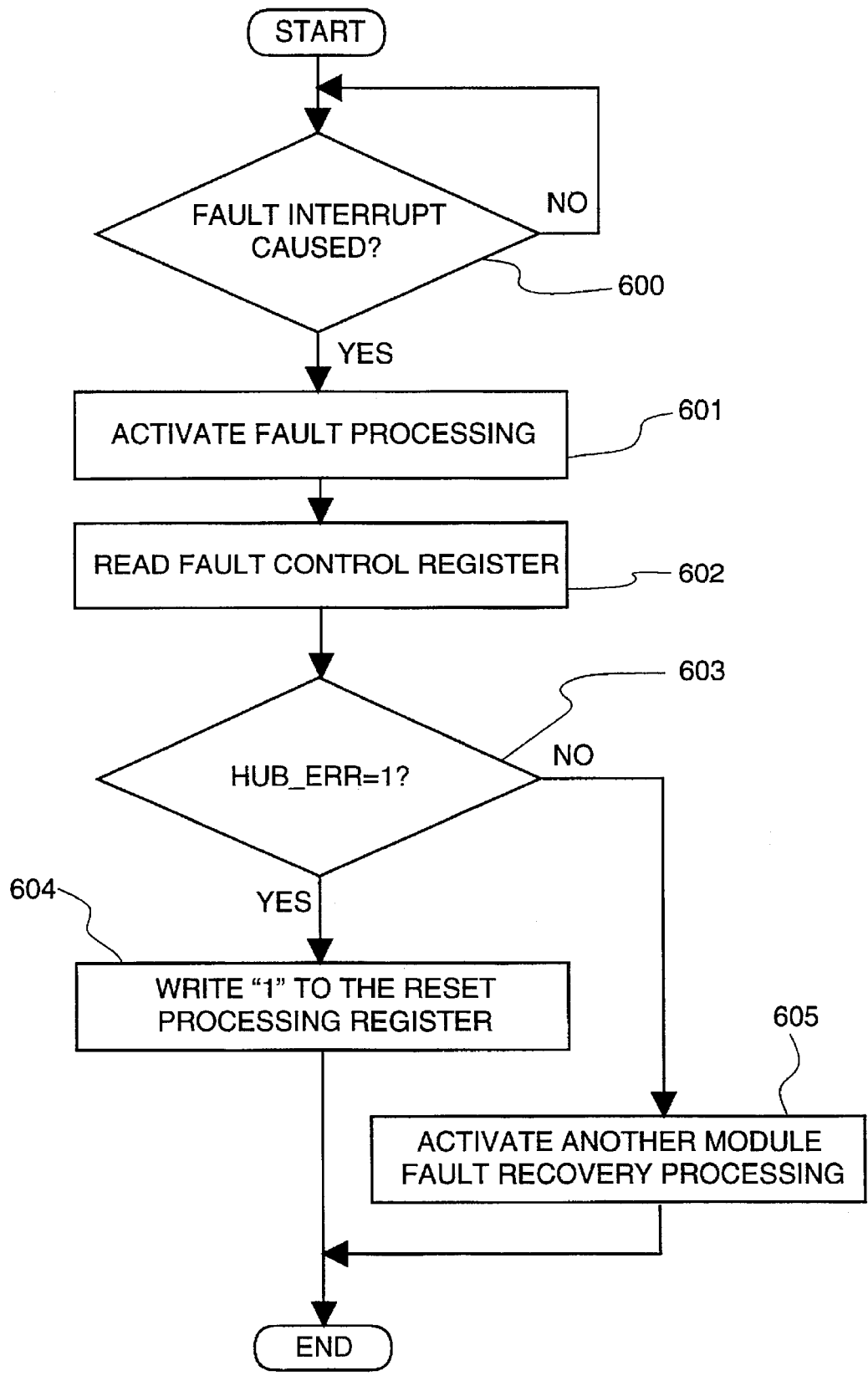
FIG. 7 is a flowchart indicating the fault processing by the adapter control program.

Now, referring to FIG. 7, there is shown a flow chart that indicates the fault processing performed by the adapter control program 501. The following describes the fault processing of the adapter control program on which a fault interrupt has been caused by the fault interrupt register 502.

In step 600, the adapter control program 501 monitors a fault interrupt. Upon detection of the fault interrupt, the adapter control program goes to step 601. In step 601, the adapter control program activates the fault processing and then goes to step 602. In step 602, the adapter control program reads the status of the fault cause control register 504 to determine the failing location. In step 603, the adapter control program determines whether the bit HUB_ERR_507 in the register HUB_STATUS 505 is set to "1" or not.

In the present embodiment, since the data communications processor 101 has the error and the bit HUB_ERR 507 in the register HUB_STATUS 505 is set to "1", the adapter control program 501 recognizes that the fault has occurred on the data communications processor 101. In step 604, the adapter control program 501 sets bit "1" in the reset processing register 503 to reset the data communications processor 101 and then issues the reset instruction signal 403 to the data communications processor 101 to end the fault processing.

In step 603, if the HUB_ERR 507 is not set to "1", the adapter control program goes to step 605. In step 605, the adapter control program references the error bit of the fault cause control register 504 for another module and activates the fault recovery processing to end the fault processing.

Turning again to FIG. 5, the following describes operations in the data communications processor 101 that has received the reset instruction from the data communication processor adapter 106. The reset instruction signal 403a sent from the data communication processor adapter 106 is received by the reset processing register 405a in the fault processing controller 205a in the interface controller 107a. Upon reception of the reset instruction signal 403a, the reset processing register 405a sends the reset request signal 404a to the arbitration controller 109.

Figure 8:
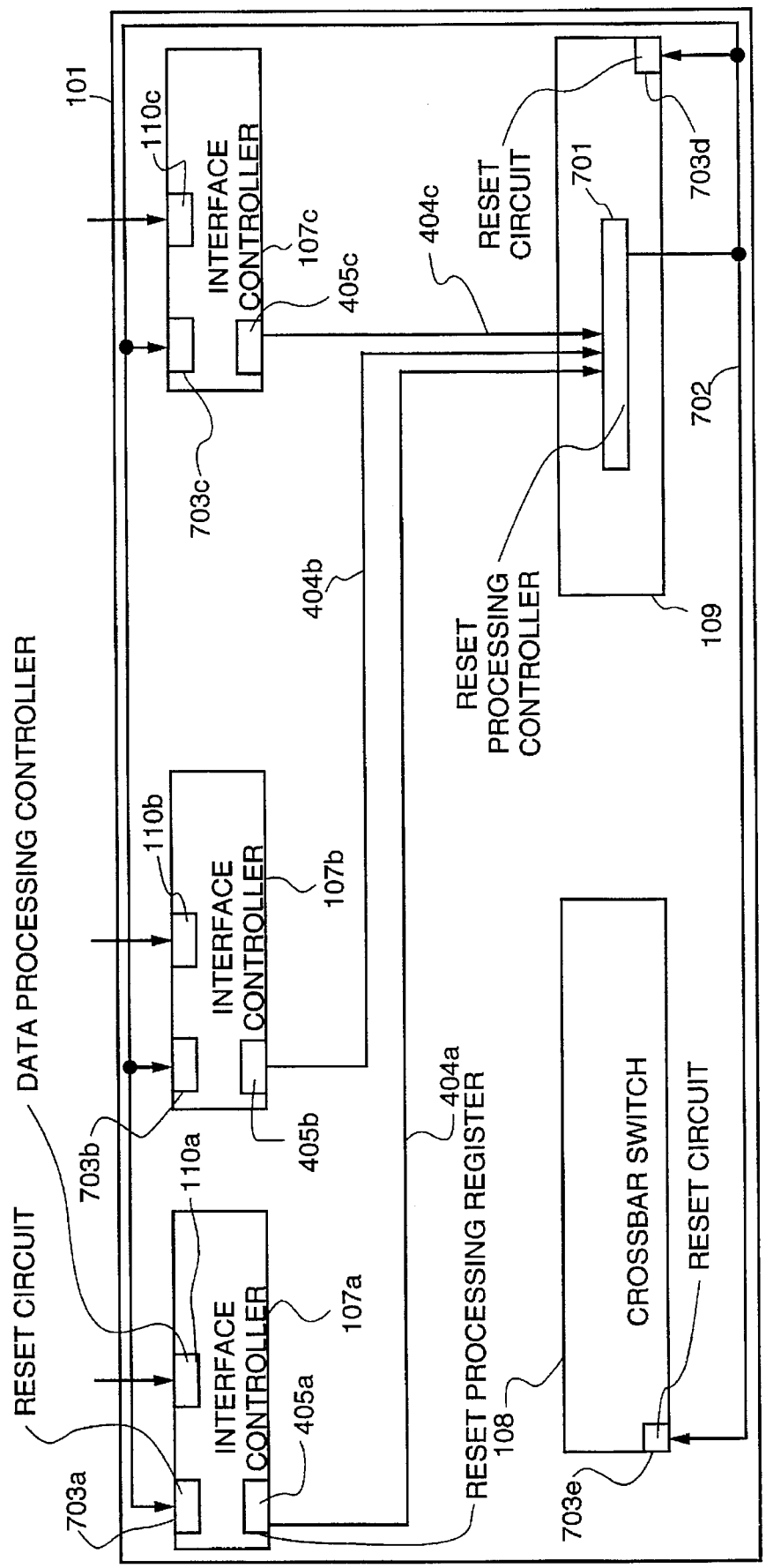
FIG. 8 is a block diagram illustrating the configuration of the data communications processor provided when the reset instruction signal is received to perform fault processing.

The following describes the fault processing by the arbitration controller 109 that has received the reset instruction signal 403a with reference to FIG. 8. FIG. 8 shows a constitution of the data communications processor 101 when the arbitration controller 109 receives the reset instruction signal to perform the fault processing.

The arbitration controller 109 is internally provided with a reset processing controller 701 that receives the reset request signals (404a through 404c) coming from the interface controllers 107a through 107c respectively. Upon reception of any of the reset request signals (404a through 404c), the reset processing controller 701 sends a reset signal 702 to reset circuits (703a through 703c) in the controllers in the data communications processor 101, namely the interface controllers (107a through 107c) respectively, a reset circuit (703d) in the arbitration controller 109, and a reset circuit (703e) in the crossbar switch 108 in order to perform the reset processing. Upon reception of the reset signal 702, the reset circuits (703a through 703e) reset the corresponding controllers.

Figure 9:
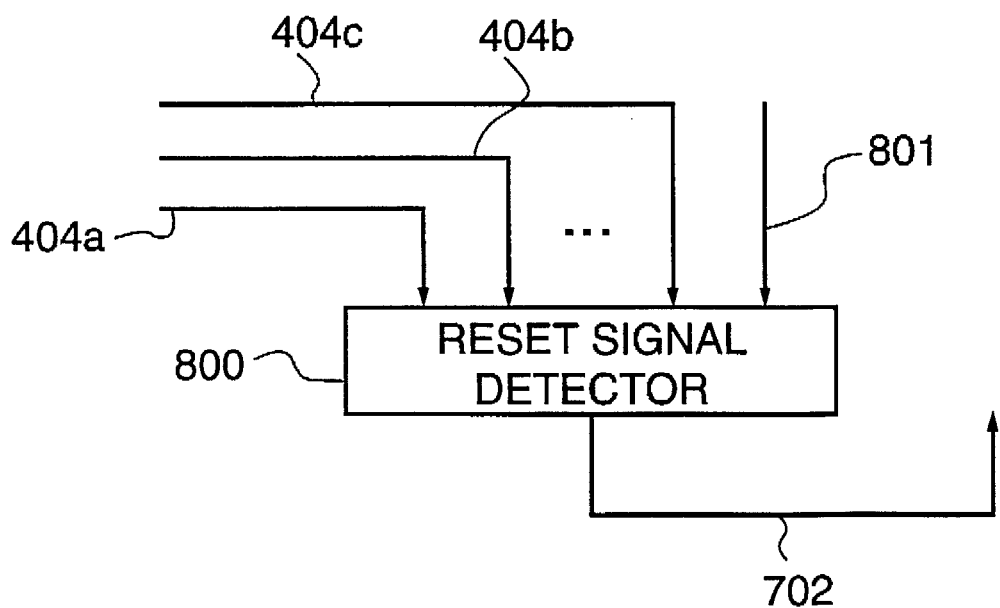
FIG. 9 is a schematic diagram of the reset processing controller in the arbitration controller.

Now, referring to FIG. 9, there is shown a constitution of the reset processing controller 701 in the arbitration controller 109. The reset processing controller is internally provided with a reset signal detector 800 that performs a logic OR operation between the reset request signals (404a through 404c) coming from the interface controllers (107a through 107c) respectively and a device power on/off reset request signal 801 for the data communications processor 101, thereby generating the reset signal 702. Namely, when any of the reset request signals (404a through 404c) and the device power on/off reset request signal for the data communications processor 101 is turned on, the reset signal detector 800 makes that signal valid to send the reset signal 702 to the interface controllers (107a through 107c), the arbitration controller 109, and the crossbar switch 108. Thus, by resetting the modules in the data communications processor 101, the data communications processor 101 can be reset.

The fault processing for the data communications processor in the information processing system has been described considering that all modules in the data communications processor very seldom fail simultaneously. Namely, referring to FIG. 3, since all of the interface controllers (107a through 107c) in the data communications processor 101 that provide paths to the information processors (100a through 100c) respectively connected to the data communications processor 101 very seldom fail simultaneously in the data communications processor 101, the data communications processor fault can be recovered by notifying the occurrence of a fault to all information processors when the fault occurs on a data communications processor to reset the data communications processor based on the reset instruction given by the information processor, thereby recovering the fault of the data communications processor. The above-mentioned setup also reduces fault recovery time because the recovery is made by reset processing.

Figure 10:
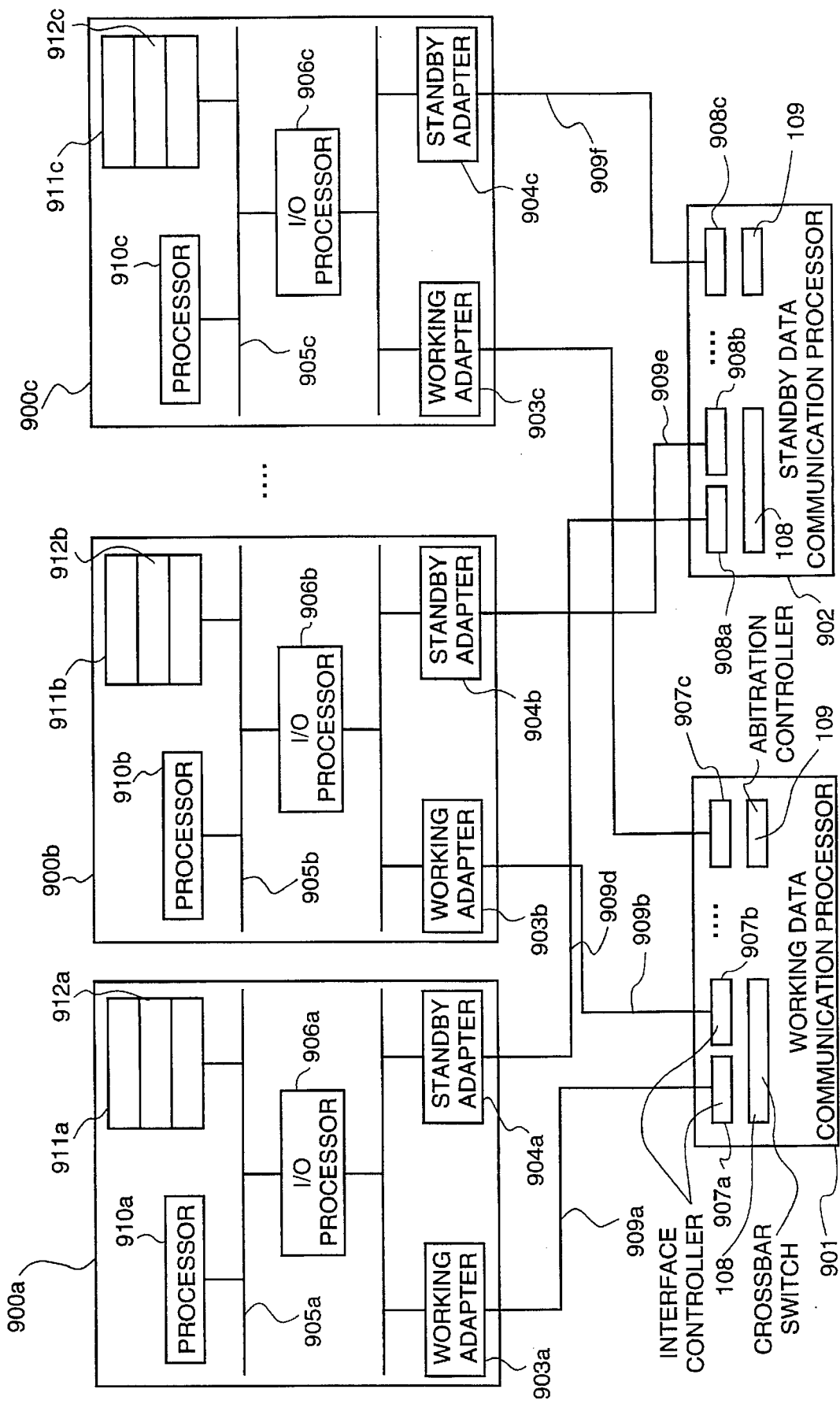
FIG. 10 is a block diagram of another embodiment of the invention.

Second embodiment:

Referring to FIG. 10, there is shown a constitution of a redundant information processing system. By duplicating the data communications processor and the data communication processor adapter, this embodiment is enhanced in system reliability and availability.

The following describes the second embodiment of the invention with reference to FIG. 10. The redundant information processing system comprises a plurality of information processors (900a through 900c) and two data communications processors, that is, a working data communications processor 901 and a standby data communications processor 902.

The information processors (900a through 900c) are internally provided with two types of data communication processor adapters respectively connected to I/O processors (906a through 906c), that is, working data communication processor adapters (903a through 903c) and standby data communication processor adapters (904a through 904c). System buses (905a through 905c) are connected with the I/O processors (906a through 906c), the processors (910a through 910c), and memories (911a through 911c).

The working data communication processor adapters (903a through 903c) in the information processors (900a through 900c) are connected to interface controllers (907a through 907c) respectively in the working data communication processor 901 via data communication interfaces (909a through 909c) respectively. The standby data communication processor adapters (904a through 904c) are connected to interface controllers (908a through 908c) respectively in the standby data communication processor 902 via data communication interfaces (909d through 909f) respectively.

Memories (911a through 911c) in the information processors (900a through 900c) each store a system monitor program (912a–912c) for controlling and monitoring the switching from the working data communication processor 901 to the standby data communication processor 902 and the switching from the working data communication processor adapters (903a through 903c) to the standby data communication processor adapters (904a through 904c).

In the normal situation, the information processing system thus constituted performs data communication between the information processors (900a through 900c) by means of the working data communication processor 901 and the working data communication processor adapters (903a through 903c). If a fault occurs on the working data communication processor 901, the failing data communication processor 901 is switched to the standby data communication processor 902 and the standby data communication processor adapters (904a through 904c) to continue the data processing.

That is, if a fault is encountered on the working data communications processor 901, the fault notification method associated with this invention is applied to notify each of the information processors (900a–900c) of the occurrence of the fault. The system monitor programs (912a–912c) that have received the fault notification through the interrupt by the I/O processors (906a–906c) stops the operation of the working data communication processor 901 by activating the adapter control program 501. Then, switching is performed from the working data communication processor 901 to the standby data communication processor 902 and from the working data communication processor adapters (903a–903c) to the standby data communication processor adapters (904a–904c) to continue the data communication between the information processors (900a–900c) based on the standby data communications processor 902 and the standby data communication processor adapters (904a–904c). For example, the operation can be performed by changing the "data communications processor reset instruction" of the data communication processor adapter control program 501 in step 604 (FIG. 7) to a "working data communication processor reset instruction and standby data communication processor adapter switching instruction".

Application of the present invention to the above-mentioned redundant information processing system configuration allows the detection of a fault on the working data communication processor 901 and the switching to the standby data communication processor 902, thereby minimizing the effect of the fault encountered on the working data communication processor 901, shortening the system shutdown time due to the fault, and continuing system service with little or no interruption.

As mentioned above and according to the invention, if a fault occurs on the data communication processor, all the information processors connected to the data communication processor are notified thereof. Since the notified information processors reset the data communication processor, fault recovery can be made in a relatively short time. Further, since the data communication processor is composed of relatively simple hardware circuits, resetting by the reset circuit allows to perform the fault processing and, at the same time, build the data communication processor at relatively low cost. In addition, provision of the fault notification path and the reset processing notification path in the data communication processor separate from the data communication path relatively simplifies the constitution of the hardware logic circuit.

We claim:

1. A fault processing method for a data communications processor in an information processing system having a plurality of information processors, said data communications processor controlling data communication between said plurality of information processors, comprising the steps of:

notifying all of said plurality of information processors if a fault occurs in said data communications processor while said information processing system is operating;

instructing said data communications processor from said notified plurality of information processors to perform a reset operation; and resetting said data communications processor in its entirety in response to receiving said instruction to perform a reset operation.

2. An information processing system comprising:

a plurality of information processors; and a data communications processor having interface control means connected to said plurality of information processors; a communication interface for controlling data communication between said plurality of information processors, switching means for setting a data communication path between said interface control means for communicating data from a first information processor to a second information processor, and arbitrating means connecting to said switching means for arbitrating data communication requests received from said interface control means, wherein said data communications processor includes fault detecting means for detecting a fault encountered in any of said interface control means, switching means and arbitrating means in said data communication processor, notifying means connected to said switching means and said interface control means for providing fault notification to all of said plurality of information processors of an occurrence of a fault detected by said fault detecting means, and reset means for resetting said interface control means, switching means and arbitrating means in said data communication processor, wherein said plurality of information processors include instructing means for instructing said data communications processor to perform a reset operation in response to receiving the fault notification, and wherein said data communications processor resets all of said interface control means, switching means and arbitrating means in said data communications processor in response to receiving the reset instruction.

3. An information processing system according to claim 2, wherein said data communications processor includes a first fault processing controller that monitors fault detection signals coming from the interface control means, switching means and arbitrating means and turns on a fault broadcast signal to second fault processing controllers in the interface control means of the occurrence of the fault in the data communications processor.

4. An information processing system according to claim 3, wherein said first fault processing controller includes a logic OR circuit that receives said fault detection signals and provides an output as said fault broadcast signal when any of said fault detection signals has a signal indicating that a fault has been detected by a corresponding fault detecting means.

5. An information processing system according to claim 2, wherein said switching means is a crossbar switching matrix.

6. An information processing system according to claim 2, wherein said interface control means includes data communication processor adapters in each of said information processors and interface controllers in said data communications processor for controlling the interface with the information processors and wherein said switching means includes a crossbar switch for setting and controlling a data communication path, and an arbitration controller as said arbitrating means for arbitrating and/or controlling data communication requests coming from the interface controllers.

7. An information processing system according to claim 6, wherein said interface controllers contain data processing controllers and data communication controllers, respectively, wherein the data processing controllers are connected to a data communication interface in the crossbar switch via said data communication interfaces, respectively, thereby forming a data communication path in the data communications processor for connecting between the information processors.

8. An information processing system according to claim 7, wherein said arbitration controller includes a fault processing controller that monitors fault detection signals coming from the interface controllers, the arbitration controller, and the crossbar switch.

9. An information processing system according to claim 8, wherein said fault processing controller includes a fault detector and a fault log register for logging a failed location.

10. An information processing system according to claim 9, wherein said interface controllers have fault processing controllers having fault interrupt registers that receive the fault broadcast signals from the fault detector in the arbitration controller to generate fault interrupt signals to the data communication processor adapters in the information processors and reset processing registers that receive reset instruction signals from the data communication processor adapters to generate the reset instruction.

11. An information processing system according to claim 10, wherein said interface controllers have fault log registers that store the contents of the fault log register sent along with the fault broadcast signal.

12. An information processing system according to claim 8, wherein said data communication processor adapter executes an adapter control program for controlling the adapter and a fault interrupt register that receives the fault interrupt signal from the interface controllers.

13. An information processing system according to claim 12, wherein when the reset instruction signal sent from the data communication processor adapter 106 is received by the reset processing register in the fault processing controller in the interface controller, said data communication processor adapter in the data communications processor that has received the reset instruction sends the reset request signal to the arbitration controller.

14. An information processing system according to claim 13, wherein the arbitration controller has a reset processing controller that receives the reset request signals coming from the interface controllers, and upon reception of the reset request signals, the reset processing controller sends a reset signal to reset circuits in the interface controllers, including a reset circuit in the arbitration controller and a reset circuit in the crossbar switch in order to perform the reset processing.

15. An information processing system according to claim 14, wherein the reset processing controller has a reset signal detector that performs a logic OR operation between the reset request signals coming from the interface controllers respectively and a device power on/off reset request signal for the data communications processor thereby generating the reset signal so that when any of the reset request signals and the device power on/off reset request signal for the data communications processor is turned on, the reset signal detector makes that signal valid to send the reset signal to the interface controllers, the arbitration controller and the crossbar switch 108 for resetting the data communications processor.

16. An information processing system comprising:
a plurality of information processors; and
two data communications processors including a working data communications processor and a standby data communications processor connected to said plurality of information processors;
a communication interface for controlling data communication between said plurality of information processors, switching means for setting a data communication path between said interface control means for communicating data from a first information processor to a second information processor, and arbitrating means connecting to said switching means for arbitrating data communication requests received from said interface control means, wherein
said data communications processors include fault detecting means for detecting a fault encountered in any of said interface control means, switching means and arbitrating means in said data communication processor, notifying means connected to said switching means and said interface control means for providing fault notification to all of said plurality of information processors of an occurrence of a fault detected by said fault detecting means, and reset means for resetting said interface control means, switching means and arbitrating means in said data communication processor, wherein said plurality of information processors include instructing means for instructing said data communications processors to perform a reset operation in response to receiving the fault notification, and wherein said data communications processor resets all of said interface control means, switching means and arbitrating means in said data communications processor in response to receiving the reset instruction.

17. An information processing system according to claim 16, wherein the information processors have two types of data communication processor adapters respectively connected to I/O processors including working data communication processor adapters and standby data communication processor adapters.

18. An information processing system according to claim 17, wherein the working data communication processor adapters are connected to interface controllers in the working data communication processor via first data communication interfaces and the standby data communication processor adapters are connected to interface controllers in the standby data communication processor via second data communication interfaces.

19. An information processing system according to claim 18, further including memories in the information processors that store a system monitor program for controlling and monitoring the switching from the working data communication processor to the standby data communication processor and the switching from the working data communication processor adapters to the standby data communication processor adapters.

20. An information processing system according to claim 17, wherein if a fault occurs on the working data communication processor, the failed data communication processor is switched to the standby data communication processor and the standby data communication processor adapters continue the data processing.

* * * * *